United States Patent
Gulian et al.

[19]

[11] Patent Number: 5,887,983
[45] Date of Patent: Mar. 30, 1999

[54] BEARING ASSEMBLY FOR RADAR MAST

[75] Inventors: Paul M. Gulian, Chadds Ford, Pa.;
Thomas A. Perotti, Mullica Hill, N.J.;
Mark Stusnick, Huntington Valley, Pa.

[73] Assignee: The United States of America as represented by the Secretary of the Navy, Washington, D.C.

[21] Appl. No.: 995,136

[22] Filed: Dec. 19, 1997

[51] Int. Cl.⁶ ............................ F16C 33/22; F16C 35/02
[52] U.S. Cl. ............................................. 384/296; 384/439
[58] Field of Search ........................................ 384/439, 275, 384/276, 280, 281, 282, 295, 296, 428, 226

[56] References Cited

U.S. PATENT DOCUMENTS

| | | | |
|---|---|---|---|
| 2,495,169 | 1/1950 | Jennings et al. | 384/275 X |
| 2,635,015 | 4/1953 | Babb | 384/428 X |
| 3,468,587 | 9/1969 | Hillander | 384/295 X |
| 4,382,598 | 5/1983 | McCloud | 384/285 X |
| 4,472,150 | 9/1984 | Tang | 384/281 X |
| 4,764,036 | 8/1988 | McPherson | 384/285 |
| 5,236,784 | 8/1993 | Kobayashi et al. | 428/408 |
| 5,267,798 | 12/1993 | Budris | 384/282 X |

*Primary Examiner*—Thomas R. Hannon
*Attorney, Agent, or Firm*—John Forrest; Jacob Shuster

[57] ABSTRACT

A bearing assembly underlying the top flange connected to the upper end of an antenna shaft, includes plastic bearing inserts held in contact with the shaft angularly spaced from each other by an outer cylindrical housing and sleeve sections retained therein in axial abutment with the bearing inserts. Removable screw fasteners having upper end portions exposed in alignment with each other underlying the top flange, hold the bearing inserts, the sleeve sections and the housing attached to each other in proper assembled relation to facilitate assembly and disassembly for bearing insert replacement.

9 Claims, 3 Drawing Sheets

BEARING ASSEMBLY FOR RADAR MAST

The present invention relates in general to a bearing assembly for rotational support of a vertical shaft, such as that associated with an antenna mast.

BACKGROUND OF THE INVENTION

Upper bearing assemblies in current use for support of navigational radar antenna masts, have various problems associated therewith, primarily attributable to grease fittings that are not readily visible and are inaccessible after bearing installation on a submarine, for example, leading to improper lubrication and excessive bearing wear requiring frequent replacement of such bearing assemblies. Bearing replacement involving removal of the antenna mast is a labor intensive task, especially in view of the weight of bearing parts. It is therefore an important object of the present invention to provide a bearing assembly for the foregoing type of installation which is more easily installed and replaced with reduced weight parts and which is less likely to experience and/or impose rapid or excessive wear.

SUMMARY OF THE INVENTION

In accordance with the present invention, the shaft of an antenna mast having a top flange at its upper end, is supported for rotation about the shaft axis by a bearing assembly underlying the top flange. The bearing assembly features split bearing inserts positioned in contact with the shaft within a cylindrical housing having radial flanges at opposite axial ends thereof for respectively retaining the bearing inserts therein and supporting the housing on the mast foundation structure. The bearing inserts positioned with shaft exposing gaps therebetween are respectively attached by screws to sleeve sections angularly spaced within the housing in angular alignment with the bearing inserts and with radial clearance about the shaft. Removable screw fasteners secure the angularly positioned sleeve sections to an attachment flange of the housing which is secured to the foundation by screw fasteners extending through shims spacing the flange from the foundation on which it is supported. All of the foregoing screw fasteners have head portions at the upper ends thereof exposed about the shaft in general alignment with a common plane underlying the top flange of the shaft to facilitate assembly and disassembly of the bearing. The housing and sleeve sections of the bearing are made of light-weight metal, while the bearing inserts are made of a plastic material having a self-lubricating property.

BRIEF DESCRIPTION DRAWING FIGURES

A more complete appreciation of the invention and many of its attendant advantages will be readily appreciated as the same becomes better understood by reference to the following detailed description when considered in connection with the accompanying drawing wherein:

FIG. 1 is a side section view through a bearing assembly rotationally supporting an upper end portion of an antenna within its foundation structure;

FIGS. 2 and 3 are transverse section views taken substantially through planes indicated by section lines 2—2 and 3—3 in FIG. 1;

FIGS. 4, 5 and 6 are partial section views taken substantially through planes indicated by section lines 4—4, 5—5 and 6—6 in FIG. 2; and FIG. 7 is a partial section view taken substantially through a plane indicated by section line 7—7 in FIG. 3.

DETAILED DESCRIPTION OF PREFERRED EMBODIMENT

Figure 1:
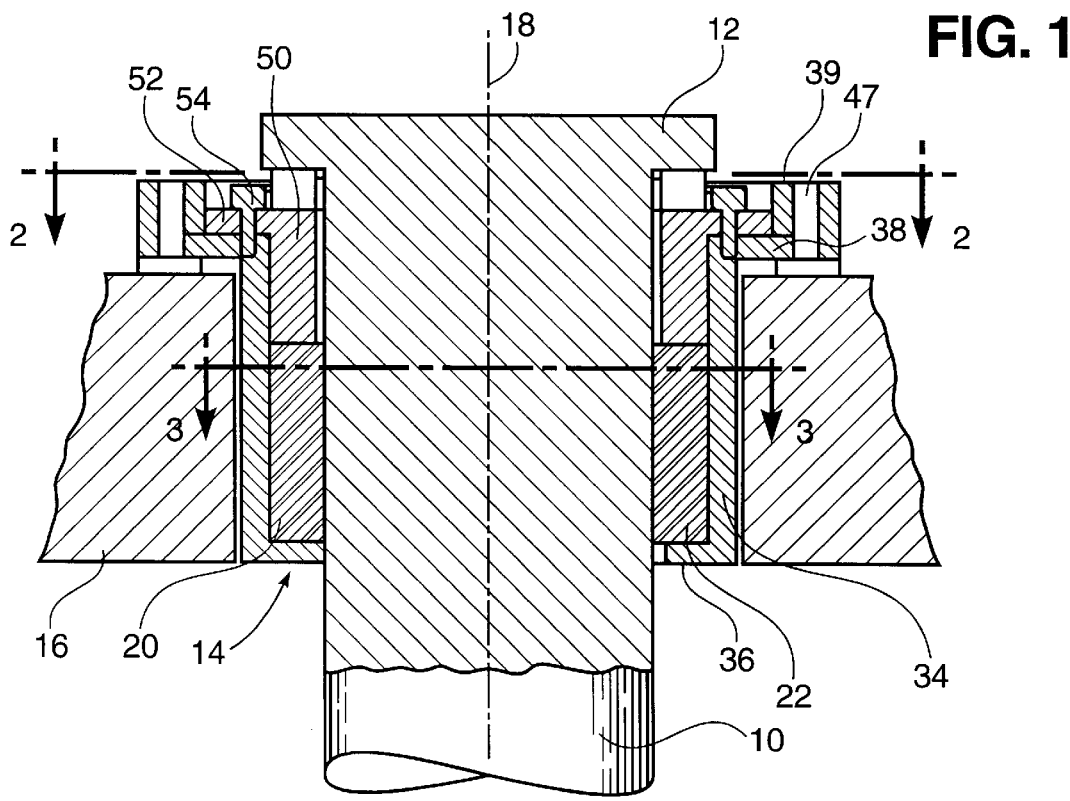
Figure 3:
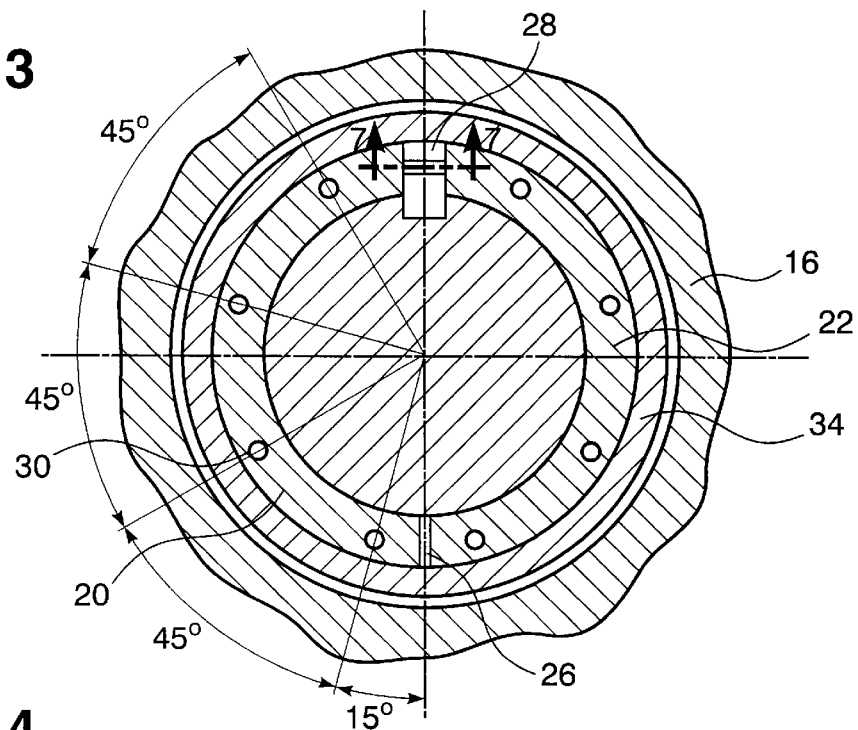
Figure 5:
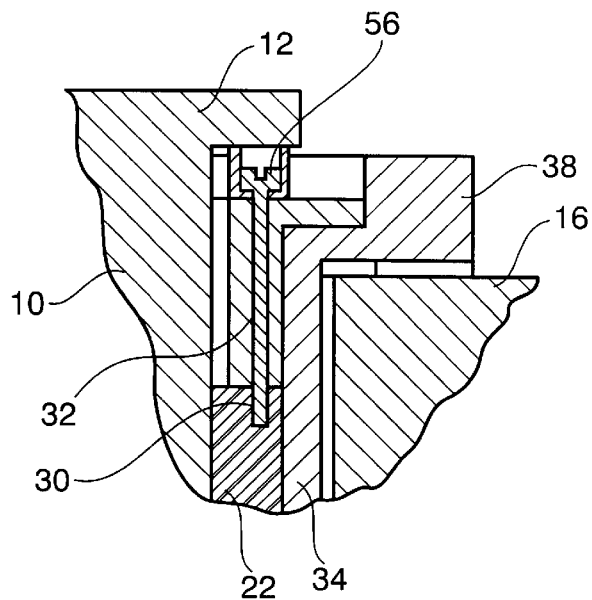

Referring now to the drawings in detail, FIG. 1 illustrates a vertically elongated cylindrical shaft 10 having a top flange 12 extending radially therefrom at its upper end as part of a RADAR antenna mast supported by an upper bearing assembly 14 within a foundation 16 for rotation relative thereto about the axis 18 of the shaft 10 as well as vertical displacement along said axis 18. As shown in FIGS. 1 and 3, the bearing assembly 14 features a pair of replaceable split bearing inserts 20 and 22 in contact with the shaft 10 vertically spaced below its flange 12. The inserts 20 and 22 are made of a crystalline thermoplastic homopolymer material exhibiting an exceptionally low coefficient of friction and a high self-lubricating characteristic. Such bearing insert material is initially machined into a cylindrical sleeve dimensioned to fit about the shaft 10 and then split into the bearing inserts 20 and 22 by cutting a narrow slot in the sleeve forming gap 26 and a wider slot forming gap 28 at diametrically opposed locations as shown in FIG. 3 which also shows each of the inserts 20 and 22 formed with four (4) threaded holes 30 angularly spaced from each other by 45° and by 15° from the gap 26. The holes 30 receive attachment screws 32 as shown in FIG. 5 for holding the inserts in angularly spaced relation to each other as hereinafter explained.

Figure 2:
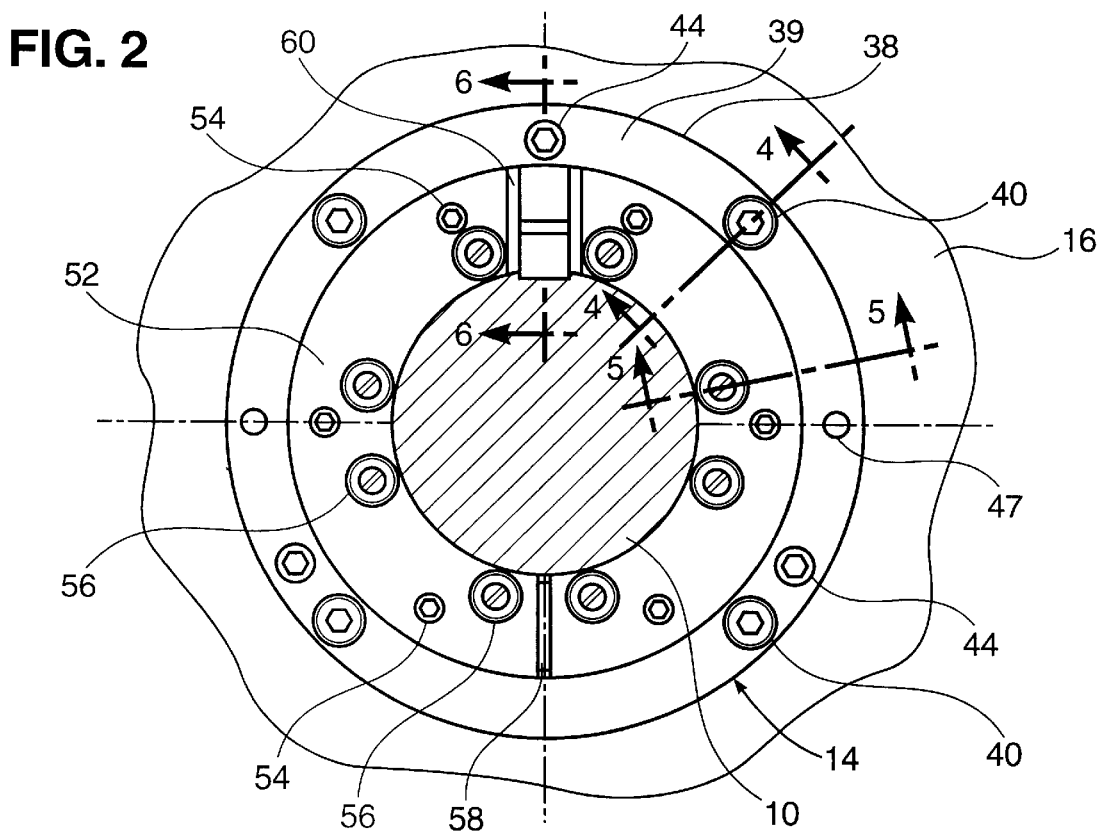
Figure 4:
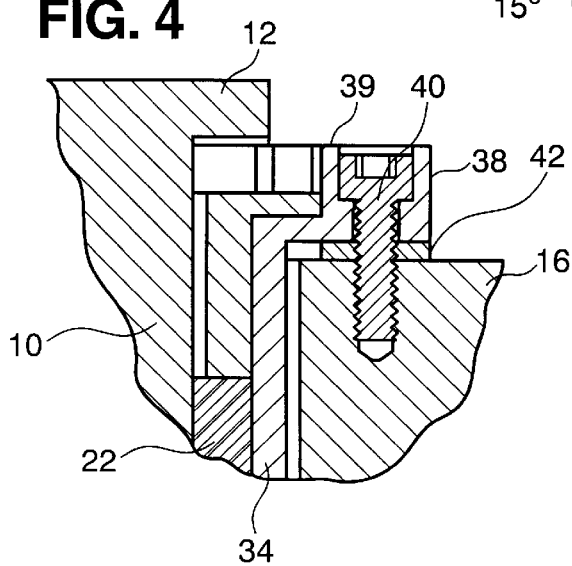
Figure 6:
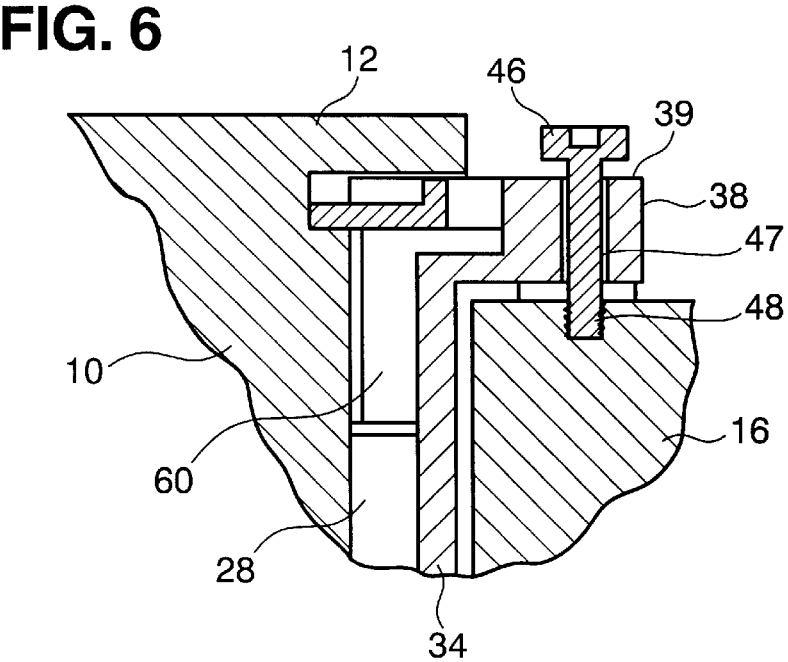

The bearing inserts 20 and 22 are retained in position on the shaft 10 within the foundation by a cylindrical housing sleeve 34 having a retention flange 36 at its lower end in axial abutment with the lower ends of the inserts as shown in FIG. 1. The housing sleeve 34 also has a radially extending attachment flange 38 at its upper axial end for support thereof on top of the foundation 16. The housing sleeve 34 is attached through its radially outer rim section 39 on flange 38 to the foundation 16 by four angularly spaced screws 40 as shown in FIGS. 2 and 4. Shims 42 through which the screws 40 extend, space the flange 38 from the foundation 16 as shown in FIG. 4. Preceding attachment of the housing sleeve 34 to the foundation by screws 40, it is angularly positioned in bearing alignment with shaft axis 18 on the foundation. Two (2) dowel pins 46 are then inserted through openings 47 into holes 48 formed in the foundation as shown in FIG. 6. To aid in aligning the housing sleeve 34, three (3) tapped jacking screw holes, 44, are provided as shown in FIG. 2.

Figure 7:
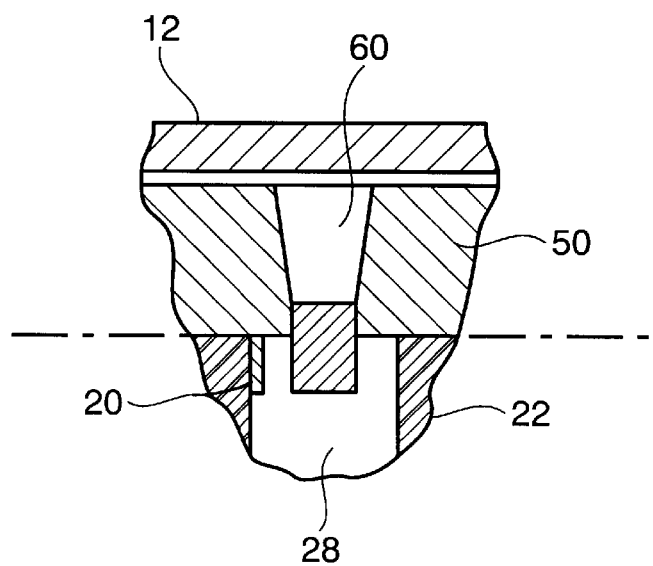

Installation of the bearing assembly 14 is completed by insertion of angular sleeve sections 50 into contact with the housing sleeve 34 and in axial abutment with the upper axial ends of the bearing inserts 20 and 22 as shown in FIG. 1. Such sleeve sections 50 are attached through support flanges 52 positioned on the housing flange 38, by screws 54, to the upper end portion of the housing sleeve 34 thereby held in radially spaced clearance relation to the shaft 10. Four (4) screw fasteners 56 extend from each support flange 52 of each sleeve section 50 into the aforementioned threaded holes 30 formed in the bearing inserts 20 and 22 for attachment of the sleeve sections 50 thereto as shown in FIG. 5. Thus, the head portions of all screw fasteners 40, 54 and 56 are exposed just below the top flange 12 of the shaft 10 in general alignment with a common plane as shown in FIG. 2. The sleeve sections 50 so assembled within the bearing are closely spaced from each other about the shaft 10 by a narrow gap 58 as shown in FIG. 2 in alignment above gap 26 and by a wider gap 60 in alignment with gap 28 between the inserts 20 and 22 as shown in FIGS. 2, 6 and 7.

Thus, the bearing assembly 14 may be readily disassembled by withdrawal of screw fasteners 54 and 56 for replacement of time bearing inserts 20 and 22 without RADAR mast removal. Except for such bearing inserts, made of a self-lubricating plastic, the other bearing parts 34 and 50 are made of a metal such as NI-CU so as to provide a bearing assembly of reduced weight with significantly reduced mechanical wear on both the mast and bearing.

Obviously, other modifications and variations of the present invention may be possible in light of the foregoing teachings. It is therefore to be understood that within the scope of the appended claims the invention may be practiced otherwise than as specifically described.

What is claimed is:

1. A bearing assembly for a shaft having a rotational axis extending through a foundation on which the shaft is guidingly supported, comprising: a pair of bearing inserts made of self-lubricating material; housing means supported by the foundation for retention of the bearing inserts assembled in contact with the shaft; angular sleeve sections positioned within the housing means in axial abutment with the bearing inserts; and removable attachment means exposed in general alignment with each other for holding the housing means attached to the foundation and the sleeve sections positioned therein in angularly spaced relation to each other to maintain rotational support of the shaft by the bearing inserts.

2. The bearing assembly as defined in claim 1 wherein said housing means comprises: a cylindrical housing sleeve positioned within the foundation having a retention flange at a lower axial end on which the bearing inserts are seated and an attachment flange at an upper axial end overlying the foundation.

3. The bearing assembly as defined in claim 2 including support flanges extending radially from the angular sleeve sections along the attachment flange of the housing means; said removable attachment means including fastener means on the support flanges for securing the sleeve sections to the housing sleeve in angularly spaced relation to each other exposing therebelow angular gaps between the bearing inserts; and a plurality of angularly spaced fasteners extending from the attachment flange into the foundation in radially spaced relation to the support flange.

4. The bearing assembly as defined in claim 3 wherein said shaft has a top flange attached thereto to form an antenna mast.

5. The bearing assembly as defined in claim 1, further including support flanges extending radially from the angular sleeve sections; said removable attachment means comprising: means on the support flanges for securing the sleeve sections to the housing means in angular spaced relation to each other exposing therebelow angular gaps between the bearing inserts; and a plurality of angularly spaced fasteners extending from the housing means into the foundation in radially spaced relation to the support flanges.

6. The bearing assembly as defined in claim 5 wherein said housing means comprises: a cylindrical housing sleeve positioned within the foundation having a retention flange at a lower axial end on which the bearing inserts are seated and an attachment flange at an upper axial end overlying the foundation and axially spaced therefrom by shims through which the angularly spaced fasteners extend into the foundation.

7. The bearing assembly as defined in claim 6 further including fastener means extending from the sleeve sections into the bearing inserts for retaining the bearing inserts angularly spaced about the shaft to establish said angular gaps therebetween.

8. The bearing assembly as defined in claim 7 wherein the attachment flange has an outer rim in abutment with the support flanges and through which said angularly spaced fasteners extend into the foundation.

9. The bearing assembly as defined in claim 6 wherein the attachment flange has an outer rim in abutment with the support flanges and through which said angularly spaced fasteners extend into the foundation.

* * * * *